United States Patent
Chamand et al.

(10) Patent No.: US 11,011,949 B2
(45) Date of Patent: May 18, 2021

(54) ROTOR FOR A ROTARY ELECTRIC MACHINE

(71) Applicant: MOTEURS LEROY-SOMER, Angouleme (FR)

(72) Inventors: Jeremy Chamand, Saint Symphorien d'Ozon (FR); Gaetan Adrien, Chaponnay (FR)

(73) Assignee: MOTEURS LEROY-SOMER, Angouleme (FR)

( * ) Notice: Subject to any disclaimer, the term of this patent is extended or adjusted under 35 U.S.C. 154(b) by 128 days.

(21) Appl. No.: 16/276,797

(22) Filed: Feb. 15, 2019

(65) Prior Publication Data

US 2019/0260245 A1 Aug. 22, 2019

(30) Foreign Application Priority Data

Feb. 16, 2018 (FR) ...................... 18 51343

(51) Int. Cl.
| | | |
|---|---|---|
| *H02K 21/12* | (2006.01) | |
| *H02K 1/27* | (2006.01) | |
| *H02K 1/30* | (2006.01) | |
| *H02K 15/03* | (2006.01) | |
| *H02K 1/28* | (2006.01) | |

(52) U.S. Cl.
CPC ............ *H02K 1/2733* (2013.01); *H02K 1/28* (2013.01); *H02K 1/30* (2013.01); *H02K 15/03* (2013.01); *H02K 1/278* (2013.01); *H02K 2213/03* (2013.01)

(58) Field of Classification Search
CPC ...... H02K 1/278; H02K 1/165; H02K 1/2733; H02K 1/28; H02K 1/30; H02K 15/03

USPC ....................................... 310/156.08–153.12
See application file for complete search history.

(56) References Cited

U.S. PATENT DOCUMENTS

| | | | | | |
|---|---|---|---|---|---|
| 5,923,111 | A * | 7/1999 | Eno | ........................ | E21B 43/128 310/153 |
| 6,404,086 | B1 * | 6/2002 | Fukasaku | .............. | F16F 1/3873 310/156.08 |
| 7,120,986 | B2 * | 10/2006 | Kojima | ..................... | H02K 1/30 29/596 |
| 8,299,661 | B2 * | 10/2012 | Jeung | ................... | H02K 1/2733 310/51 |
| 8,482,178 | B2 * | 7/2013 | Okitsu | ................... | H02K 1/278 310/156.27 |
| 2011/0210635 | A1 * | 9/2011 | Musselman | ............ | H02K 15/03 310/156.21 |

(Continued)

FOREIGN PATENT DOCUMENTS

| | | |
|---|---|---|
| EP | 3 001 037 A1 | 3/2016 |
| JP | 2006-203968 | 8/2006 |
| WO | WO 2015/022140 A2 | 2/2015 |

OTHER PUBLICATIONS

French Preliminary Search Report dated Oct. 30, 2018 in French Application 18 51343, filed on Feb. 16, 2018 (with English Translation of Categories of Cited Documents).

*Primary Examiner* — Thanh Lam
(74) *Attorney, Agent, or Firm* — Oblon, McClelland, Maier & Neustadt, L.L.P.

(57) ABSTRACT

Rotor (1) for a rotary electric machine, comprising:
a shaft (2);
at least one annular shaped magnet (10) engaged on the shaft;
at least one elastically deformable component (9) radially interposed between the shaft (2) and the magnet (10).

7 Claims, 3 Drawing Sheets

(56) References Cited

U.S. PATENT DOCUMENTS

2014/0251816 A1    9/2014  Musselman et al.
2016/0094099 A1    3/2016  Moritz et al.

\* cited by examiner

ROTOR FOR A ROTARY ELECTRIC MACHINE

The present invention relates to rotary electric machines and, more specifically, to the rotors of electric motors.

It is known for annular shaped permanent magnets to be assembled on the shaft of a rotor by bonding.

However, the use of adhesive may involve, in the presence of volatile solvents, proceeding under conditions that are restrictive for the operators. Furthermore, the adhesive must be selected so that it maintains its adhesive function over time, despite the thermal stresses associated with the operation of the machine, particularly the differential expansion between the material of the shaft and that of the magnets, and the exposure to a relatively aggressive environment in some applications. Finally, a clearance needs to be provided between the magnets and the shaft for the assembly thereof, which can lead to an error in concentricity.

Consequently, there is a need to further improve the design of the rotors for rotary electric machines and for overcoming the aforementioned disadvantages of the current solutions.

The invention achieves this aim by proposing a rotor for a rotary electric machine, comprising:
a shaft;
at least one annular shaped magnet engaged on the shaft;
at least one elastically y deformable component radially interposed between the shaft and the magnet.

By virtue of the invention, the immobilization of the one or more magnet(s) on the shaft may be implemented without adhesive, through contact friction between the one or more elastically deformable component(s) and the one or more magnet(s), on the one hand, and contact friction of the one or more elastically deformable component(s) on the shaft, on the other hand.

The one or more elastically deformable component(s) help(s) make the magnets concentric relative to the shaft, which very easily eliminates any error in concentricity. Furthermore, the one or more elastically deformable component(s) allow(s) the differential expansion between the material of the shaft and that of the magnets to be absorbed.

Preferably, the at least one annular shaped magnet is put in place after the insertion of the at least one elastically deformable component.

The one or each elastically deformable component preferably is a seal, which advantageously is annular.

By way of a variation, the elastically deformable component is in the form of a sleeve or a sock engaged on the shaft. By way of another variation, each elastically deformable component is in the form of an elongated seal extending along the shaft.

Preferably, the shaft comprises a plurality of grooves, and each groove receives a seal.

More preferably, these grooves are annular shaped, as are the seals.

In one variation, the shaft comprises a plurality of axial grooves, and each of these axial grooves receives a seal of elongated shape along the shaft.

The material and the hardness of the seals may be selected according to the operating conditions. For example, seals made of FKM are used for temperature resistance.

The Shore A or D hardness of the seals ranges from 70 to 90, for example.

Preferably, the seals that are used are O-rings, or seals with a polygonal section, particularly a rectangular or multi-lobed section, particularly quadri-lobed, among other shapes.

The number of grooves, as well as the hardness of the seal, or the compression of the seal, is selected as a function of the number of magnets to be assembled on the shaft and of the torque applied on each magnet. For example, the higher the torque, the greater the number of seals.

Preferably, the shaft comprises between 1 and 40 grooves and the rotor comprises between 1 and 20 magnets. The number of seals is, for example, at least twice that of the magnets, with each magnet then resting on at least two seals. The grooves may be distributed on the shaft in pairs, with each pair of grooves receiving the two seals intended to support a magnet, with the gap between two grooves of a pair being greater than the gap between the adjacent grooves of neighboring pairs. The gap also may be the same.

The shaft may be produced by machining, in a monolithic manner, from a preferably magnetic material, such as mild steel.

Preferably, the magnets have a rotationally cylindrical shape, with a rotationally cylindrical radially internal surface and a radially external surface that is also rotationally cylindrical.

The grooves may be machined in a rotationally cylindrical surface of the shaft, with an external diameter between 10 and 100 mm, for example.

Each magnet may comprise two or more poles. The poles of two consecutive magnets may or may not be angularly offset.

A further aim of the invention is the rotary electric machine comprising such a rotor.

A further aim of the invention is a method for manufacturing a rotor for a rotary electric machine, particularly a machine as described above, in which a shaft is machined in order to form grooves, particularly of annular shape, seals, particularly annular seals, are disposed in the grooves and annular shaped permanent magnets are mounted on the shaft, so that said permanent magnets are frictionally retained on the shaft by the seals.

The invention will be better understood upon reading the following detailed description of non-limiting embodiments of the invention, and with reference to the accompanying drawings, in which.

The rotor 1 shown in FIGS. 1 to 5 is a rotor for a permanent magnet electric motor.

This rotor 1 comprises a shaft 2, for example, made of magnetic steel, having a main part 3 and end parts 4 intended to be engaged in bearings, not shown in these figures.

Figure 1:
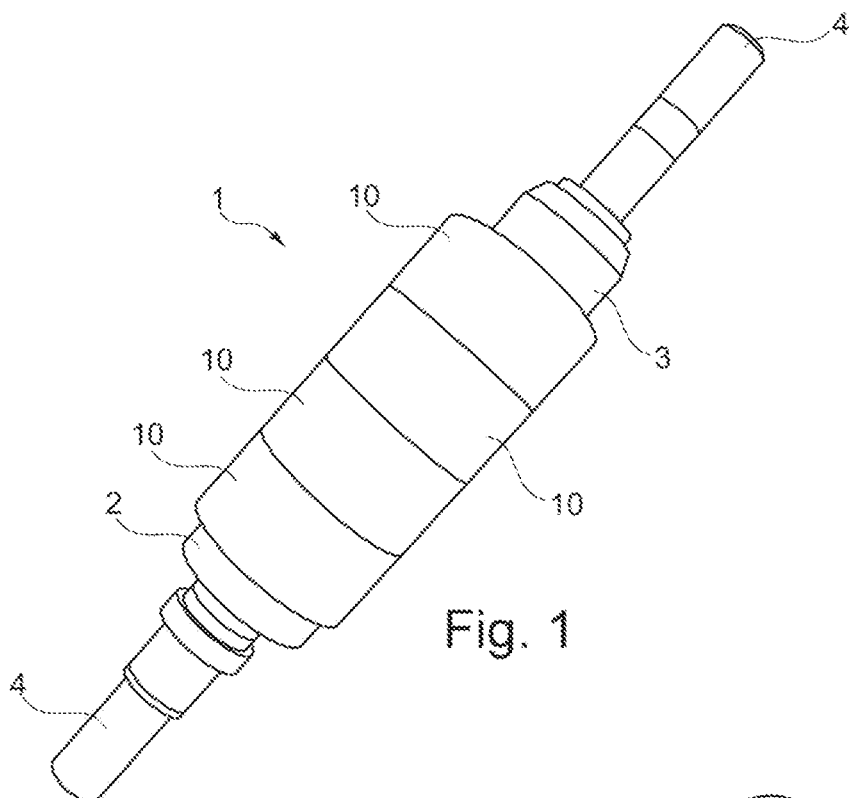
FIG. 1 shows an example of a rotor for an electric machine according to the invention.
Figure 2:
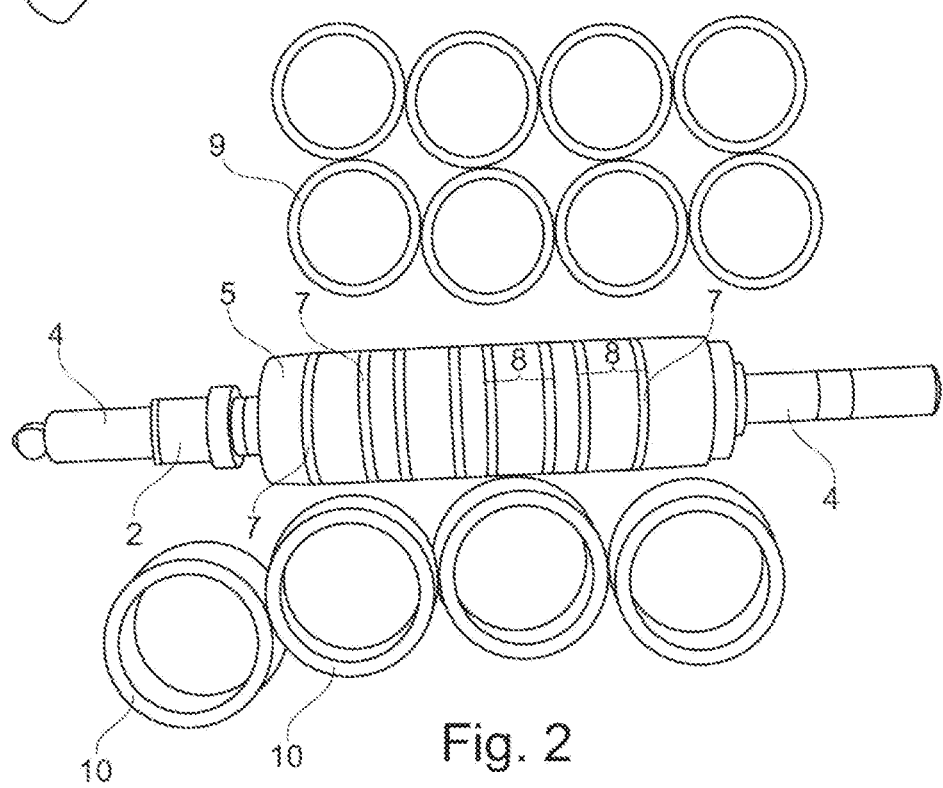
FIG. 2 shows the constituent elements of the rotor of FIG. 1 in the non-assembled state.
Figure 3:
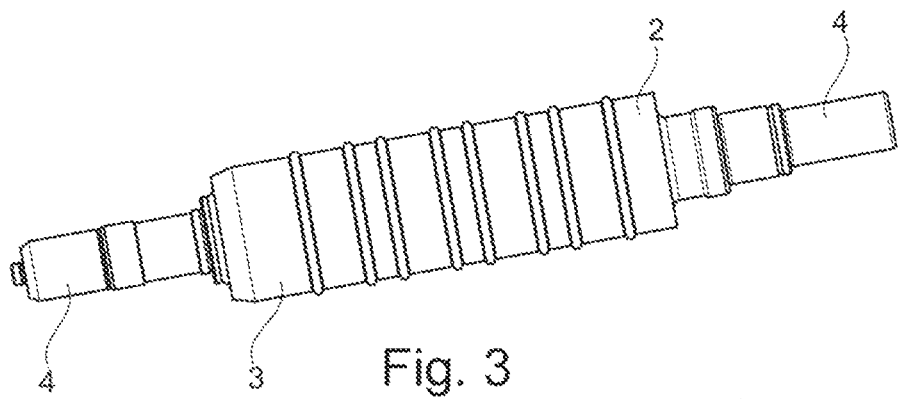
FIG. 3 shows the shaft following assembly of the seals.
Figure 4:
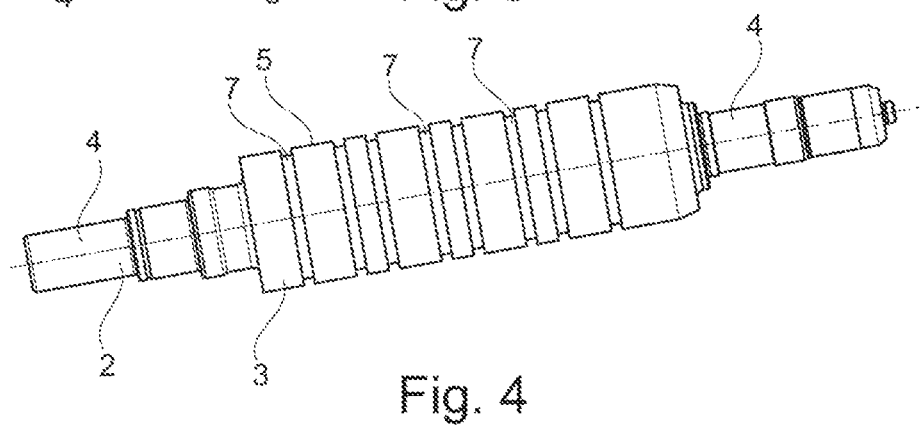
FIG. 4 shows the shaft of FIG. 3 without the seals.

The main part 3 has a rotationally cylindrical surface 5, on which annular grooves 7 are produced by machining, as may be seen in FIG. 2 in particular. Each groove 7 preferably has a rectangular shaped section.

Figure 5:
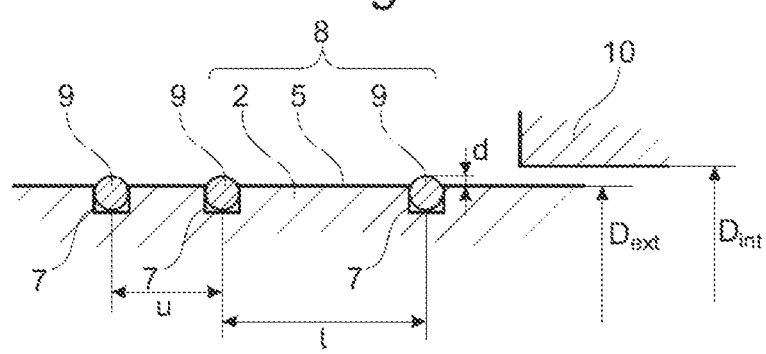
FIG. 5 shows various dimensions.

There are eight grooves 7 in the example shown and they are distributed in pairs 8. The gap t between the axes of two grooves 7 of a pair 8 is, for example, greater than the gap u between the axes of two grooves 8 of adjacent pairs, as shown in FIG. 5. For example, t is between 10 and 15 mm and u is between 2 and 15 mm; u even is between 0.2 t and 1 t, for example. O-rings 9 are disposed in the grooves 7. The section of the seals 9 is selected so that the seals 9 project on the external surface of the main part of the rotor.

For a 27 mm external diameter Dext of the main part 3, the depth of the grooves is 1.76 mm, for example, and the diameter thereof is 23.48 mm, so that the O-rings 9 project by a distance d of 0.825 mm relative to the surface 5 of the shaft.

Annular shaped permanent magnets 10 are mounted on the shaft 2.

Seals 9 are directly in contact with the annular shaped magnets 10 and with the shaft 2.

The internal diameter Dint of these magnets 10 is less than Dext +2d, so that the magnets rub on the seals and are frictionally immobilized on the shaft 2.

Preferably, Dint=Dext+s·2d, with s being between 0.01 and 0.9, preferably 20% compression, which provides good retention of the magnets without damaging the seals or making installation of the magnets too difficult.

Each magnet 10 rests on the two seals 9 of a pair 8 by being centered thereon.

Each magnet has two N and S poles, or more than two poles, for example, 2 N poles and two S poles, with the magnetization being radial.

In one embodiment, the external diameter Dext of the main part is 38.18 mm, the section diameter of the O-rings 9 is 2.62 mm, the depth of the grooves 7 is 1.76 mm, and the internal diameter Dint of the permanent magnets 10 is 38.45 mm.

In order to assemble the rotor, the seals 9 are disposed in the grooves 7 by virtue of the elasticity of the constituent material thereof, then the permanent magnets are slipped onto the seals 9 one after the other.

Figure 6:
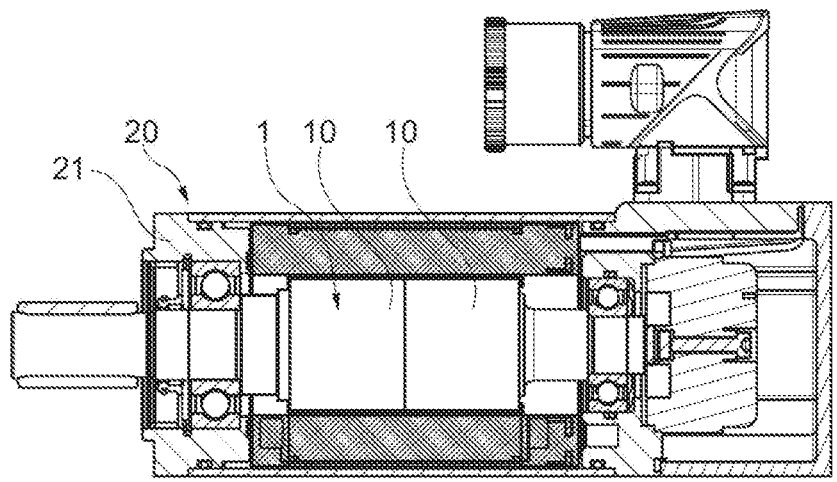
FIG. 6 shows a longitudinal section view of an example of a machine according to the invention.

The rotor 1 according to the invention is housed in a stator 21 in order to form a rotary machine 20, an example of which is schematically shown in FIG. 6. The stator 21 may be of any type. The electric machine 20 preferably is an electric motor, for example, a synchronous motor.

In this figure, the rotor 1 is shown with two magnets 10.

Figure 7:
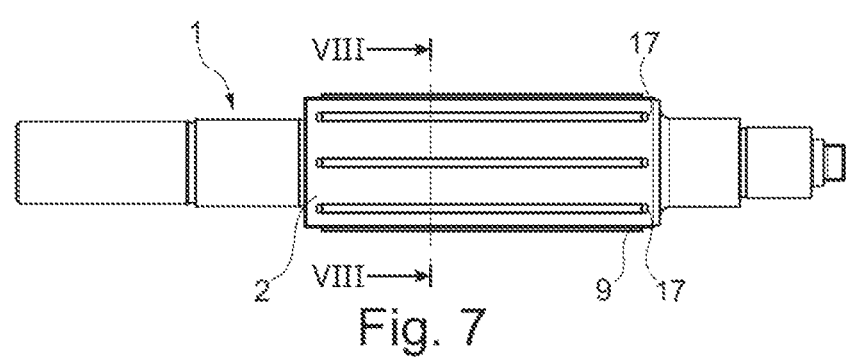
FIG. 7 shows a variation of a rotor according to the invention.
Figures 8, 10, 11:
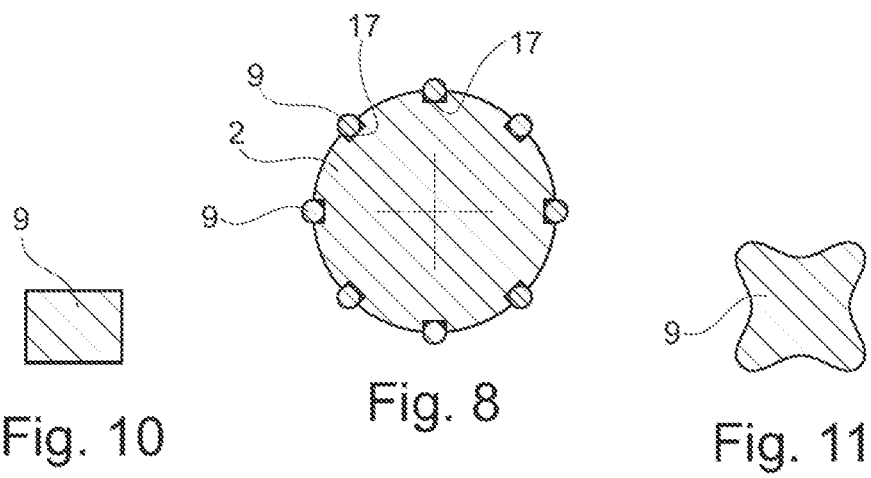
FIG. 8 is a transverse section view along VIII-VIII of FIG. 7.
FIGS. 10 and 11 show examples of variations of sections of seals.

FIGS. 7 and 8 show a variation of a rotor 1, in which the seals 9 are in the form of strips parallel to the longitudinal axis of the rotor, with each seal 9 being disposed in a groove 17 in the form of a slot parallel to the axis of rotation.

The grooves 17 are evenly distributed about the longitudinal axis of the rotor, with there being eight grooves, for example, as shown. The magnets 10 are fitted on the seals 9.

Figure 9:
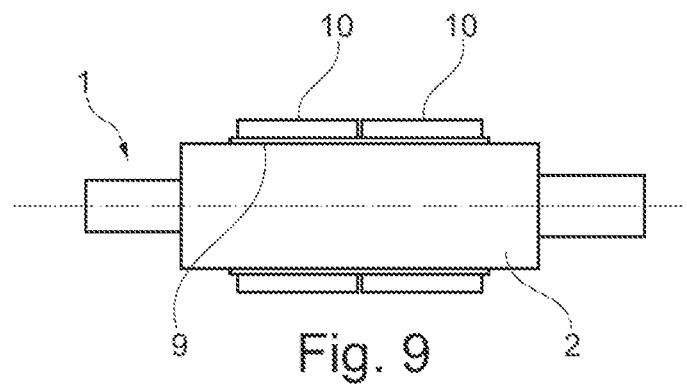
FIG. 9 is a longitudinal section view of a variation of a rotor according to the invention.

FIG. 9 shows a variation of a rotor, in which the one or more magnet(s) 10 is/are mounted on a tubular sleeve 9 made of elastomer that is inserted on the shaft 2.

The sleeve 9 preferably extends over a distance that is greater than the cumulative width of the magnets 10, as shown.

The sleeve 9 is directly in contact with the magnets 10 and with the shaft 2.

The motor can be a servomotor. Of course, the invention is not limited to the previously described example. For example, the number of grooves 7 or 17 and of seals 9, and the number of magnets 10, may be different.

The seals 9 may be rings and have a circular section, or may be annular with a rectangular section, as shown in FIG. 10, or may be quadri-lobed, as shown in FIG. 11.

The invention claimed is:

1. Rotor for a rotary electric machine, comprising:
   a shaft;
   at least one annular shaped magnet engaged on the shaft;
   at least one elastically deformable component radially interposed between the shaft and the magnet, the shaft being provided with a plurality of grooves, with seals each being disposed in a respective groove, said at least one magnet radially pressing on at least one of the seals.

2. Rotor according to claim 1, the grooves being annular, as are the seals.

3. Rotor according to claim 2, the seals being O-rings, or having a rectangular or multi-lobed section.

4. Rotor according to claim 1, the shaft comprising between 2 and 40 grooves.

5. Rotor according to claim 1, the rotor comprising between 1 and 20 magnets.

6. Rotor according to claim 1, each magnet resting on at least two seals.

7. Rotor according to claim 1, the grooves being axial, the machine comprising a plurality of seals engaged in said axial grooves.

\* \* \* \* \*